US010002008B2

(12) United States Patent
Juslin et al.

(10) Patent No.: US 10,002,008 B2
(45) Date of Patent: Jun. 19, 2018

(54) MANUAL, A METHOD, APPARATUS AND A COMPUTER PROGRAM PRODUCT FOR CONFIGURING A FREQUENCY CONVERTER

(71) Applicant: ABB Oy, Helsinki (FI)

(72) Inventors: Mika Juslin, Espoo (FI); Juha Martinmaa, Helsinki (FI); Petri Kahelin, Helsinki (FI)

(73) Assignee: ABB Oy, Helsinki (FI)

( * ) Notice: Subject to any disclaimer, the term of this patent is extended or adjusted under 35 U.S.C. 154(b) by 485 days.

(21) Appl. No.: 14/458,336

(22) Filed: Aug. 13, 2014

(65) Prior Publication Data

US 2015/0048157 A1 Feb. 19, 2015

(30) Foreign Application Priority Data

Aug. 13, 2013 (EP) ..................... 13180239

(51) Int. Cl.
*G06F 9/445* (2018.01)
*G05B 19/042* (2006.01)
*G06K 19/06* (2006.01)
*G06K 19/07* (2006.01)

(52) U.S. Cl.
CPC ...... *G06F 9/44505* (2013.01); *G05B 19/0426* (2013.01); *G06K 19/06028* (2013.01); *G06K 19/06037* (2013.01); *G06K 19/0723* (2013.01)

(58) Field of Classification Search
CPC ............................................. G06K 19/06028
USPC .................... 235/375, 487, 492, 494; 361/18
See application file for complete search history.

(56) References Cited

U.S. PATENT DOCUMENTS

| 2005/0195537 A1* | 9/2005 | Virolainen | G05B 19/0426 361/18 |
| 2011/0106681 A1* | 5/2011 | Cockerell | G06Q 10/06 705/35 |
| 2012/0098643 A1* | 4/2012 | Gunther | G06K 7/10435 340/10.1 |
| 2013/0082098 A1* | 4/2013 | Tam | G06F 9/00 235/375 |
| 2013/0222559 A1* | 8/2013 | Lebaschi | G06K 7/0004 348/61 |

(Continued)

FOREIGN PATENT DOCUMENTS

| EP | 1 369 755 A2 | 12/2003 |
| EP | 2 602 929 A1 | 6/2013 |

OTHER PUBLICATIONS

European Search Report dated Feb. 17, 2014, by the European Patent Office in corresponding European Patent Application No. 13 18 0239. (2 pages).

*Primary Examiner* — Allyson Trail
(74) *Attorney, Agent, or Firm* — Taft Stettinius & Hollister LLP; J. Bruce Schelkopf (57) ABSTRACT

A manual is disclosed for a frequency converter and a method, apparatus and a computer program product are disclosed for configuring a frequency converter. The manual can include a data storage storing operational configuration information of the frequency converter; wherein the configuration information is encoded to the data storage to be wirelessly readable from the data storage. The configuration information is obtained from the manual by wireless reading, and installed to the frequency converter by transmitting the obtained configuration information over a wireless connection.

20 Claims, 3 Drawing Sheets

(56) References Cited

U.S. PATENT DOCUMENTS

2013/0299571 A1* 11/2013 Metso ..................... G06F 17/30
  235/375

* cited by examiner

MANUAL, A METHOD, APPARATUS AND A COMPUTER PROGRAM PRODUCT FOR CONFIGURING A FREQUENCY CONVERTER

RELATED APPLICATION

This application claims priority under 35 U.S.C. § 119 to European Patent Application No. 13180239.9 filed in Europe on Aug. 13, 2013, the entire content of which is hereby incorporated by reference in its entirety.

FIELD

The present disclosure relates to frequency converters used to control frequency of electrical power, and for example to configuring such frequency converters.

BACKGROUND INFORMATION

The following description of background art may include insights, discoveries, understandings or disclosures, or associations together with disclosures not known to the relevant art prior to the present invention but provided by the invention. Some such contributions of the invention may be specifically pointed out, whereas other such contributions will be apparent from their context.

Frequency converters are used to change frequency and magnitude of electrical power supplied to a load. Frequency converters have been used in Alternating Current AC motor drives. In an exemplary, a frequency converter receives AC current from an electrical power supply and converts the frequency of the received AC current to another frequency after which the AC current is supplied to an AC electric motor. Also further parameters, for example a voltage level, of the received AC current may be changed. The AC motors are used in various applications including but not limited to fans and pumps. In many applications the use of frequency converters provides significant energy savings compared to supplying electrical power having a constant frequency.

Present frequency converters are configured to meet specific needs of their operating environment. The operating environment may be defined by the properties of electric motors driven by the frequency converters and application areas of the electric motors. Accordingly, the frequency converter may be configured by parameters that match a specific operating environment. These parameters may be defined by properties of the equipment the frequency converter drives either directly or indirectly, for example properties of the electric motors and pumps or fans driven by the electric motor.

Frequency converters may be added peripheral devices that add functionality to the frequency converter. Such peripheral devices may provide improved energy efficiency in a specific drive application or the peripherals may provide some other preferred additional feature. However, there exist a variety of peripherals and a variety of types of each peripheral, whereby installing a peripheral to a frequency converter involves configuring the frequency converter with correct parameters and in some cases updating the software of the frequency converter.

In practice, frequency converters may have thousands of parameters and macros that involve highly competent people to set correct operation of the frequency converter and/or peripherals added to the frequency converter. Thereby, configuring the frequency converter is a time consuming task and involves presence of the competent personnel at the location of the frequency converter. During the time the configuration of the frequency converter is incomplete, the applications are out of use and inefficiently used.

SUMMARY

A manual for a frequency converter is disclosed, comprising: a data storage storing operational configuration information of the frequency converter; wherein the configuration information is encoded to the data storage to be wirelessly readable from the data storage.

A method for execution by a wireless communications device is disclosed, comprising: obtaining configuration information of a frequency converter from a data storage in a manual for a frequency converter, the manual having a data storage storing operational configuration information of the frequency converter; wherein the configuration information is encoded to the data storage to be wirelessly readable from the data storage; and installing the obtained configuration information to the frequency converter by transmitting the obtained configuration information over a wireless connection.

An apparatus is disclosed comprising: a first communications interface for reading a data storage of a manual for a frequency converter, the manual having a data storage storing operational configuration information of the frequency converter; wherein the configuration information is encoded to the data storage to be wirelessly readable from the data storage; a second communications interface for communicating with a frequency converter over a wireless connection; and means configured for performing, when in operation, obtaining configuration information of a frequency converter from the data storage in the manual; and installing the obtained configuration information to the frequency converter by transmitting the obtained configuration information over a wireless connection.

A computer program embodied on a non-transitory distribution medium is disclosed, having program instructions which, when loaded into an apparatus will cause execution of functions comprising: obtaining configuration information of a frequency converter from a data storage in a manual for a frequency converter, the manual having a data storage storing operational configuration information of the frequency converter; wherein the configuration information is encoded to the data storage to be wirelessly readable from the data storage; and installing the obtained configuration information to the frequency converter by transmitting the obtained configuration information over a wireless connection.

BRIEF DESCRIPTION OF THE DRAWINGS

In the following, features and advantages disclosed herein will be described in greater detail by way of exemplary embodiments with reference to the attached drawings, in which.

DETAILED DESCRIPTION

The following presents a simplified overview as a basic understanding of some aspects disclosed herein. This summary is not an extensive overview. It is not intended to identify all key/critical elements or to delineate the scope of the invention. Its sole purpose is to present some concepts disclosed herein in a simplified form as a prelude to the more detailed description of exemplary embodiments illustrated for the drawings.

According to an exemplary aspect, there is provided a manual for a frequency converter, having a data storage storing operational configuration information of the frequency converter; wherein the configuration information is encoded to the data storage to be wirelessly readable from the data storage.

According to an exemplary aspect there is provided a method by a wireless communications device, including, obtaining configuration information of a frequency converter from a data storage in a manual according to an exemplary aspect, and installing the obtained configuration information to the frequency converter by transmitting the obtained configuration information over a wireless connection.

According to an exemplary aspect, there is provided an apparatus having a first communications interface for reading a data storage of a manual according to an aspect, a second communications interface for communicating with a frequency converter over a wireless connection; the apparatus having means for performing the steps of methods disclosed herein.

According to an exemplary aspect there is provided a non-transitory computer program product having executable code that when executed, will cause execution of functions of methods disclosed herein.

According to an exemplary aspect there is provided an apparatus having a first communications interface for reading a data storage of a manual according to an aspect, a second communications interface for communicating with a frequency converter over a wireless connection, a memory storing program code instructions, and a controller operatively coupled to the memory and the first communications interface and the second communications interface, wherein execution of said program code instructions by the controller, will cause execution of exemplary methods disclosed herein.

Various embodiments can provide fast configuration of frequency converters. Manuals according to various embodiments provide configuration information in a machine-readable format that may be wirelessly read. In this way a large number of parameters may be read quickly read and human errors in reading the parameters may be kept low. A mobile communications device according to various embodiments can install a configuration to frequency converters over a wireless connection, when within the communications range from the frequency converter. In exemplary embodiments, the mobile communications device can provide on-site adjustment of configuration information and/or troubleshooting for the frequency converters.

Figure 1:
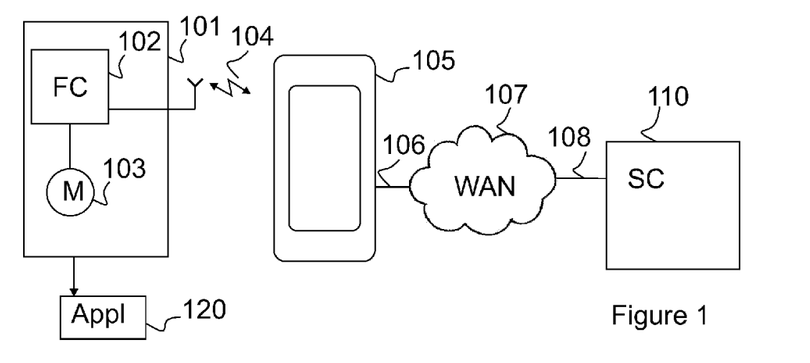
FIG. 1 illustrates entities involved in configuring a drive system, according to an exemplary embodiment.

FIG. 1 illustrates entities involved in configuring a drive system 101, according to an exemplary embodiment. The drive system may be installed to drive a specific application 120. Examples of the applications include an elevator, a crane, a pump, a conveyor belt and a fan. In the following, a configuration of the drive system is described by configuring the frequency converter 102 that supplies electrical power to an electrical motor 103, for example an AC motor, that drives the application 120.

The architecture can provide wireless configuration on the frequency converter 102 by a mobile communications device MCD 105, when the mobile communications device 105 is within a range wireless connection 104 from the drive system. The MCD connects to a service centre 110 for information on configuring the drive system. The MCD may connect to both the drive system and the service centre. The connection to the service centre may be a wired or wireless connection.

The frequency converter can connect to the components of the drive systems by electrical connections that provide transmission of electrical power and/or communications. The frequency converter has an input, through which it receives electrical power from an electrical power supply. The frequency converter has an output that supplies electrical power obtained by converting the frequency and/or further characteristics of the electrical power received in its input. For example, the electrical power supplied by the frequency converter can have a different frequency than the input electrical power, since the frequency of the input electrical power is converted by the frequency converter to match properties of the electrical motor and/or properties of a pump or fan driven by the electric motor.

The frequency converter can include communications means for communicating with the mobile communications device 105 over the wireless connection 104. The communications means may be provided by an adapter, such as an antenna, that is connected to the frequency converter. The wireless connection may be a short range wireless connection for example a Bluetooth connection, a wireless local area network WLAN connection, an infrared connection or a near filed communications NFC connection. The WLAN connection can for example conform to the IEEE 802.11 family of specifications, however, also other specifications may be used to implement the WLAN connection.

A short range wireless connection has for example a range that allows a person holding the mobile communications device to visually observe the frequency converter. The above explained connection types for the short range wireless connection provide such a range. For example, the IEEE 802.11 WLAN can have a range of 35 m indoors. The ranges of Bluetooth and NFC are for example even shorter than the range provided by the IEEE 802.11 WLAN. NFC connections have even shorter ranges that may even involve a touch between the communicating devices. Infrared connection can involve a direct connection without obstacles, whereby the distance between the mobile communications device and the frequency converter that are connected by an infrared connection, is for example limited to 10 m, such as when frequency converters deployed indoors are considered.

The mobile communications device MCD may include a user interface for displaying information to a user carrying the MCD and communications means for establishing connections over a short range wireless connection and to the service center. The user interface may be provided as a graphical user interface on a display of the mobile communications device for representing information visually to the user. The user interface may include input means, for example one or more buttons, for receiving input from the user of the mobile communications device. A touchscreen may be used to implement the functionalities of the user interface. The communications means may include adapters according to the communications technology and/or standard used for communicating with the frequency converter and the service center. For example, the adapters may include a Bluetooth adapter and an adapter for a mobile communications network (e.g., the GSM). It is also possible to implement different communications technologies into a single chip, as is known in present day mobile phones.

Accordingly, the MCD may include a portable terminal device that establishes and maintains connections in a communications network (e.g., the WAN), and/or directly to one or more other terminals or computers (e.g., the frequency converter). The communications network may include a wired or wireless access network, for example Ethernet based Local Area Network or a mobile communications network.

The service center can for example include one or more servers that maintain information associated with frequency converters. The information maintained at the service center forms a knowledge-base that is accessible for maintenance personnel via remote or local computers. In one example, the knowledge-base may be implemented as a database, using known database systems, where the frequency converter information may be obtained by database applications, such as SQL or MS Access.

Following the illustration of FIG. 1, the MCD is connected directly to the frequency converter by the wireless connection and over a wide area network WAN 107 to the service center 110. The MCD connects to the WAN 107 on a wired or wireless connection 106 and the service center connects to the WAN over a wired or wireless connection 108. The connections 106, 108 to the WAN may conform to a standard used to implement the WAN or a part of the WAN. The WAN or a part of the WAN may be implemented as a communications network conforming to a communications standard for example: Ethernet, Internet Protocol version 4, Internet Protocol version 6, Global System for Mobile Communications (GSM), Universal Mobile telecommunications System UMTS, Long Term Evolution LTE and LTE-A. Accordingly, the MCD and the service center may be terminals of one or more of the above defined communications networks.

The MCD can connect to the knowledge-base maintained at the service center over the WAN and obtain information from the knowledge-base, for example software updates to frequency converters, configuration information of frequency converters and/or troubleshooting information.

WANs can cover broad areas, for example regions or countries, thereby providing connections between different geographical locations. WANs may include sub-networks connected together by routers that route traffic between the sub-networks. The sub-networks may include access networks providing wired or wireless connectivity. The MCD and the service center may be connected to the WAN by the sub-networks. Examples of the access networks include wireless communications networks conforming to the above-mentioned wireless communications network standards and wired access networks, such as the Ethernet based Local Area Networks LANs.

Figure 2A:
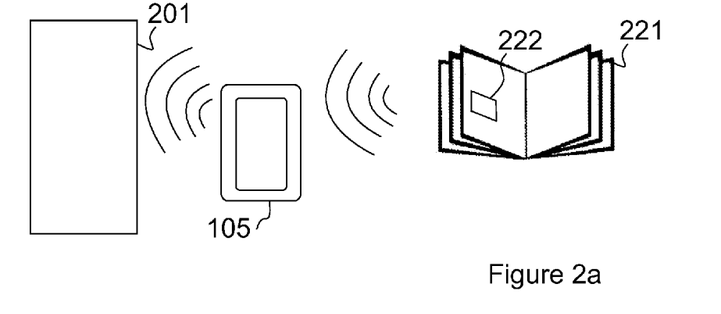
FIGS. 2a and 2b illustrate configuring a frequency converter wirelessly, according to exemplary embodiments.
Figure 2B:
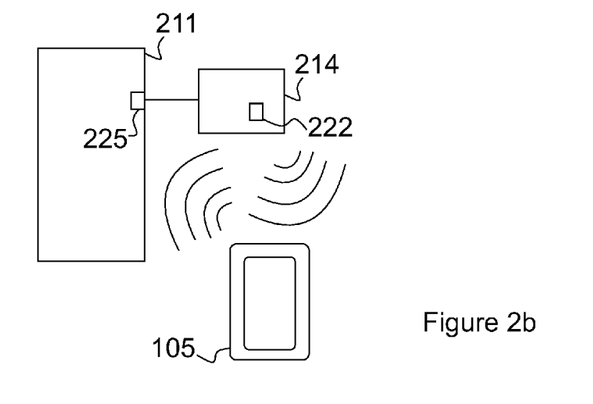

FIGS. 2a and 2b illustrate configuring a frequency converter 201, 211 wirelessly, according to exemplary embodiments. The frequency converter may be deployed in a drive system according to FIG. 1. A manual 221 of the frequency converter includes a data storage 222. The manual may include a plurality of data storages that each includes different configuration information. For example, the data storage is a machine-readable data storage, for example a memory chip or an optical code. In this way configuration information may be read fast by a reader corresponding to the type of the machine-readable code.

In an exemplary embodiment, the data storage contains configuration information encoded in a format that is wirelessly readable. In this way the, configuration information may be read across a distance from the data storage.

In exemplary embodiments, the data storage may itself be the manual as is illustrated in FIG. 2b, where the data storage is deployed on a peripheral unit 214 connected to a connector 225 in the frequency converter 221. The connector connects the peripheral unit to the frequency converter. An exemplary connector connects the peripheral unit electrically to the frequency converter. The connection includes one or more wires transferring electrical power and/or communications signals between the frequency converter and the peripheral unit.

Examples of the peripheral units include encoders that connect to electric motors for measuring rotational speed of the motors. Further examples include communications units that connect the frequency converter to a field bus. In this way the frequency converter may be monitored remotely from a control room as is known especially in large industrial automation systems. For example, field buses include but are not limited to CANopen and PROFIBUS.

Examples of the configuration information can include the configuration information parameters of the frequency converter and/or operational instructions, for example macros. The parameters may include at least one from a output voltage, output electrical current, output frequency and application specific information, for example a torque and/or rotation speed.

In an exemplary embodiment the data storage may be a transponder, for example a Near Field Communications NFC tag. When the transponder is subjected to an electromagnetic field it is powered by the field such that the operational configuration information is transmitted by the transponder. For example, the electromagnetic field is generated by a radio frequency signal that is specifically transmitted by a reader device (e.g., NFC tag reader), to obtain the information stored in the transponder. The configuration information is encoded to the transponder, when the configuration information is written to the transponder by a writer device. Accordingly, when stored in the transponder, the configuration information can be read form the transponder by exposing the transponder to a specific radio frequency signal that causes the transmission of the configuration information from the transponder, whereby the configuration information is decoded. A suitable radio frequency signal for decoding the configuration information may be specific to the type of the transponder and different types of transponders may be decodable by different radio frequency signals.

In an exemplary embodiment the data storage may be an optical code, for example at least one of a bar code, a matrix barcode, a 2D-bar code and a Quick Response code, whereby the configuration information is encoded to the optical code displayed on the manual. Accordingly, the optical code may encode the configuration information into a graphical representation in one dimension, or more dimensions, e.g. 2, 3, 4 . . . N dimensions. The encoding is performed according to a symbology that defines a mapping between the configuration information and a target symbol, (e.g., the optical code). The target symbol may be a black and white symbol or a symbol with any number of colours of the electromagnetic spectrum visible to the human eye.

The frequency ranges and corresponding wavelengths of each colour are well-known to a skilled person and therefore, will not be explained herein.

Optical codes that encode source data in one dimension can include parallel lines and spaces. The source data is encoded by varying the width of the lines and spaces. When more dimensions are used to encode the source data, more complex geometrical forms of optical codes can be used, for example, rectangles, dots or hexagons.

Bar codes are one example of optical symbols. The bar codes may be classified by the number of dimensions they use to encode data, one dimensional (1D) bar codes and two dimensional (2D) bar codes. The more dimensions are used for encoding data the more data can be represented by the bar code per unit area. The 1D-bar codes use the parallel lines as explained above, for encoding source data. The 2D-bar codes encode the data into black and white pixels whose width is used to encode the source data, such as in QR-codes.

It should be appreciated that also colours may be used in optical codes to increase the dimensions of encoding the optical codes and/or to facilitate readability of the codes in different environments of use. By using a specific colour limited to a portion of the electromagnetic spectrum visible to the human eye, improved contrast of the optical codes may be provided to facilitate readability of the optical codes. It should be appreciated that if the colours used to encode an optical code correspond with only a part of the electromagnetic spectrum, optical code readers and/or display devices used to display the optical codes may be optimized to operate only on the limited region of the electromagnetic spectrum that corresponds with the colours used to encode the optical codes. In this way the more simple devices may be used which may provide cost-efficiency when implementing the embodiments.

Many present day mobile phones include NFC tag reading and writing capability and the may be used for reading data stored in transponders and/or for writing data to transponders in the embodiments described herein. Present day mobile phones also can include cameras and software that read optical codes. Reading an optical code can include taking a photo of the optical code and decoding the optical code by processing it.

The manual may be encoded in various formats. These formats include a book, a leaflet, a computer readable document or a sticker. A computer readable document may be in a Portable Document Format PDF that is readable by reader applications, for example Adobe Acrobat Reader executed on top of operating systems in computers. Also Internet Browsers may be used as readers, when supplemented by appropriate plug-ins, for example Adobe Acrobat Reader plug-in.

Referring now to FIGS. 2a and 2b, the MCD executes a process, where configuration information of a frequency converter is obtained from a data storage associated with the manual. It should be appreciated that the data storage may be the manual itself. The configuration information may be obtained by reading a transponder or an optical code. The reading may include decoding the configuration information from a transponder or an optical code as explained above.

To facilitate the reading, the manual may first have to be decoded. The decoding of the manual may include exposing the transponder or the optical code for reading. For example, when the manual is a book, the page of the book having the optical code or the transponder should be visible to the reader. Thereby, the page including the optical code should be opened from the book. It should be appreciated that there are however, different specifications and/or requirements regarding visibility for different readers. Whereas an optical code reader may involve an unobstructed view of the optical code, an NFC tag may be visible to the NFC reader even when the NFC tag was on the next double pages of a book, thus separated by a sheet of paper.

On the other hand, when the manual is a PDF document, the decoding of the manual may include executing a reader application that interprets the PDF document. To use the reader application, it may be desirable to start a computer and to enter one or more passwords.

However, when the data storage itself is the manual, as is described in FIG. 2b, decoding may not be necessary and the reading may be performed by a reader as explained above, in such cases the manual may be attached on the peripheral. The attachment may be provided for example by adhesives. A sticker is an example of such manual, since being capable of being printed an optical code or including an NFC tag.

After the configuration information is obtained from the manual, it may be installed to the frequency converter by transmitting the obtained configuration information over a wireless connection. The transmission may include establishing a wireless connection between the frequency converter and the MCD. The connection may be established, when the frequency converter and the MCD are close enough to allow reception of data over the wireless connection (e.g., within the range of a short range communications). Following the establishment of the connection, data and/or messages may be transmitted between the frequency converter and the MCD and the configuration information may be transferred from the MCD to the frequency converter. The transfer may be performed for example using a File Transfer Protocol FTP. After the transfer the Frequency converter may obtain the new configuration information and start operating accordingly. A restart of the frequency converter may be used to take the new parameters into use.

It should be appreciated that manuals including a plurality of data storages that store different configuration information provide fast deployment of different configurations to the frequency converter by reading and installing the desired configuration information. The manual may include further information, for example text, in addition to the data storage for identifying the different configurations from each other. It is also possible that the configuration information is identified by the MCD after reading the configuration information. Such identification may be performed by the MCD displaying the configuration information and/or obtaining information identifying the configuration information from a service centre.

Figure 3:
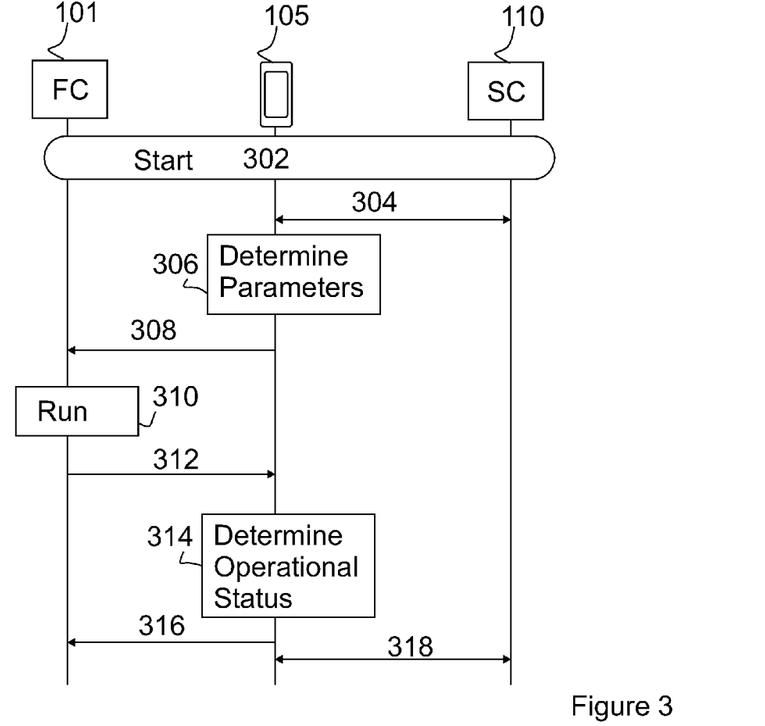
FIG. 3 illustrates processes and associated communication according to an exemplary embodiment.

FIG. 3 illustrates processes and associated communication according to an exemplary embodiment. FIG. 3 is explained with reference to the frequency converter, the MCD and the service center described above in FIG. 1. In 302 the entities 101, 105, 110 involved in the processes are switched on and operational. A process performed by each entity may be read by following the vertical line extending downwards from the respective entity.

When operational, the frequency converter and the MCD are connected by a wireless connection and the MCD may communicate with the frequency converter to exchange data and/or messages. In one example the MCD may receive information from the frequency converter, for example a serial number form the frequency converter that identifies the frequency converter.

The MCD may be connected to the SC, whereby the information identifying the frequency converter may be transmitted 304 from the MCD to the SC. In response to the information identifying the frequency converter, the SC may send 304 a software update to the MCD to be installed 308 to the frequency converter. However, it should be appreciated that it is not necessary for the MCD to be connected to the SC.

In 306 configuration information of the frequency converter is determined in the MCD. The configuration information may be the current configuration of the frequency converter which is received over the wireless connection from the frequency converter. A user of the MCD may adjust the configuration information on the MCD via the user interface of the MCD.

In an exemplary embodiment, configuration information of the frequency converter is determined 306 by reading a data storage of a manual as described with FIGS. 2a and 2b.

In 308, the configuration information adjusted in the MCD or obtained from the data storage is installed to the frequency converter. This may be performed as explained with FIGS. 2a and 2b above. The frequency converter is operated 310 using the installed configuration information.

In 312, operational information of the frequency converter is received, when the frequency converter is operated according to the installed configuration information. The operational information may be received following a specific operation cycle, for example a test run. The operational information may include fault information, load information and/or an operational status of the frequency converter.

The operation cycle may be determined by a combination of a time, electrical current and/or a supply voltage output to the electric motor driven by the frequency converter. The time and supply voltage may be determined on the basis of properties of the application and/or the electric motor, the frequency converter drives. Accordingly, in addition to the time, electrical current and supply voltage, also rotational speed and/or torque of the electric motor may be used to determine the operation cycle. These properties of the electric motor as well as properties of the application (e.g., an elevator) may be obtained to the frequency converter as is well-known in the art.

In 314 an operational status of the frequency converter is determined. The operational status indicates whether the frequency converter operates correctly when using the new parameters. The operational status may be determined on the basis of processing and evaluating the operational information received form the frequency converter. On the other hand, observations from people may be used in determining the operational status. For example, the user of the MCD may provide input to determine the operational status. It is, also possible to use a combination of the human observations and the received operational information. In one example the operational status comprises information on an operational state of the frequency converter: 'operational', 'faulty', 'maintenance'.

In an exemplary embodiment, when an operational status of the frequency converter is 'faulty', operational information of the frequency converter indicate one or more faults raised by operating the frequency converter, whereby the knowledge-base at the SC may be queried 318 for solutions to the faults.

In an exemplary embodiment, when an operational status of the frequency converter is 'maintenance', the frequency converter needs maintenance for correct operation and/or to avoid faults in its operation. The status 'maintenance' may for example indicate one or more non-critical faults, whereas in the operational status 'faulty', the indicated faults may be critical. The non-critical faults may be due to incorrect parameters of the configuration information. Accordingly, when the status is 'maintenance', the configuration information of the frequency converter may require adjusting. The adjusting may be performed by the user of the MCD. The adjusted configuration information may be then installed 316 to the frequency converter. The adjustment of the configuration information and installation of the configuration information may be performed as described above in step 306. It should be appreciated that it is possible to re-read the configuration information or another configuration information from the manual to provide the required adjustments to the configuration information.

It should be appreciated that once the MCD is connected to the frequency converter, the operational status and the configuration information of the frequency converter may be determined as separate procedures 306, 314. Their respective order may also be different from that described above. When the frequency converter is installed 308 configuration information, it may be desirable to operate the frequency converter with the new parameters to obtain operational information that reflects the new configuration information from the frequency converter. In this way the operational status may be determined 314 such that the new configuration information is considered.

When the frequency converter's operational status is 'maintenance' or 'faulty', new configuration information may be determined as described in step 306 and/or the SC may be contacted 318 to obtain configuration information that provides 314 the operational status of the frequency converter as 'operational', when installed to the frequency converter.

Figure 4:
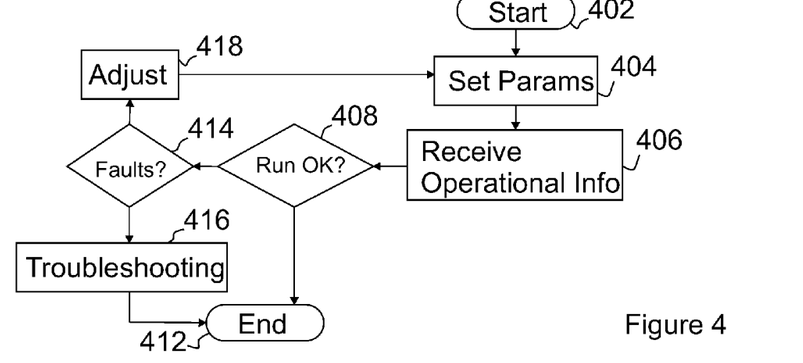
FIG. 4 illustrates a process of configuring a frequency converter by a mobile communications device, according to an exemplary embodiment.

FIG. 4 illustrates a process of configuring a frequency converter by a mobile communications device, according to an exemplary embodiment. The process may be executed by the MCD in the FIG. 3, for example. In 402, the MCD may be communicating with the frequency converter and the SC. The configuration information is installed 404 to the frequency converter and operational information is received 406 from the frequency converter, similar to described in steps 306-314 in FIG. 3. If it is determined that the frequency converter operates correctly, the process may end, when the frequency converter operates correctly in 412.

If it is determined that the frequency converter is not operating correctly, this may be due to one or more active faults. Thereby, the operational status of the frequency converter may be determined as 'faulty' or 'maintenance'. If the incorrect operation is due to faults 408, the process proceeds to 416, where the faults are troubleshooted. The troubleshooting may comprise contacting the knowledge-base in the SC to obtain instructions on solving the faults. The SC can provide instructions either by way of new configuration information and/or by verbal instructions from the maintenance personnel to the user of the MCD, to solve the faults in the frequency converter. The faults are solved in the troubleshooting and the process ends in 412.

On the other hand, if there are no faults 414, the process may proceed to 404 and the frequency converter is operating incorrectly, the process may proceed to 418, where the configuration information of the frequency converter is adjusted. The adjustments may be made to the current configuration information or to configuration information obtained from a manual, as described above with step 306. The adjusted parameters are then set to the frequency converter in 404 similar to described in step 308.

Figure 5:
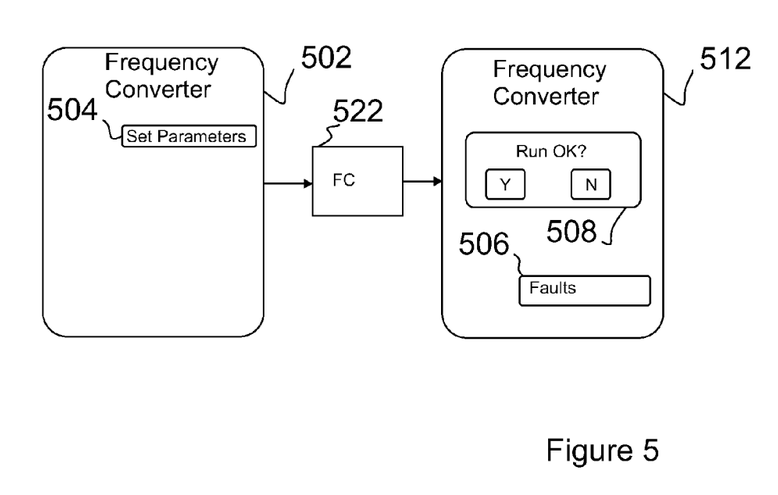
FIG. 5 illustrates an exemplary user interface of a mobile communications device at different phases of configuring a frequency converter.

FIG. 5 illustrates a user interface of a mobile communications device at different phases 502, 512 of configuring a frequency converter, according to an exemplary embodiment. In the illustration the user interface is a touch screen display to provide output and input operations to a user of the MCD. The display may have one or more control elements 504, 508 that may be activated by input from the user received to the corresponding areas of the control elements.

In a first view 502 of the user interface, the MCD stores configuration information obtained to the MCD from a manual as described in FIGS. 2a and 2b and/or configuration information adjusted at the MCD.

When the user of the MCD selects the control element 504 'Set Parameters', the configuration information is installed to the frequency converter. Accordingly, the selection made by the user to the first view may initiate the installation of the configuration information in step 308 of FIG. 3.

Later, operational information is received from the frequency converter by the MCD and operational status of the frequency covert is determined. This may be performed as described in steps 312 and 314 of FIG. 3.

A second view of the user interface may be provided to determine the operational status on the basis of input from the user. The second view may include a control element that includes areas corresponding to operational statuses of the frequency converter. The areas may be selectable by the user via the user interface. In one example the areas correspond simply to an incorrect and a correct operation of the frequency converter. Thereby, the user may be prompted by the control element to answer to a question "Does the frequency converter run OK?" and one of the areas correspond to a correct operation and the other area to an incorrect operation, whereby an input from the user to select the area indicating the correct operation determines the operational status of the frequency converter as 'operational', and selection of the other area determines the operational status of the frequency converter as 'maintenance' or 'faulty'. Separate areas may be provided in the control element for each operational status that is determined.

Accordingly, it should be appreciated that in various embodiments the operational status of the frequency converter may be followed by adjustment of the configuration information and/or troubleshooting as described in steps 416 and 418 for example.

Figure 6:
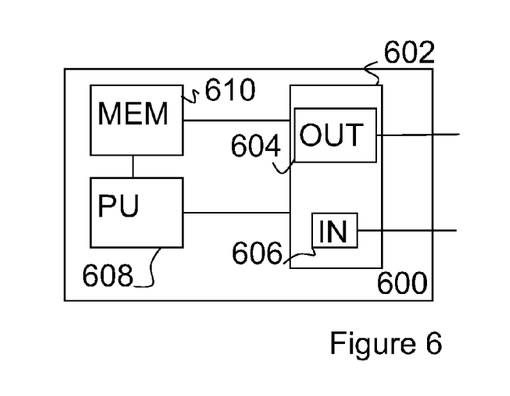
FIG. 6 is a general block diagram of an apparatus according to an exemplary embodiment.

FIG. 6 is a general block diagram of an apparatus according to an exemplary embodiment. The apparatus may include a MCD described in exemplary embodiments. Although the apparatus has been depicted as one entity, different modules and memory may be implemented in one or more physical or logical entities.

The apparatus may operate as a terminal suitable for operating as a termination point for telecommunication sessions. Examples of the terminal include but are not limited to user equipment (UE), a mobile phone, communicator, PDA, application server or a computer.

The apparatus 600 can include an interfacing unit 602, a central processing unit (CPU) 608, and a memory 610, that are all being electrically interconnected. The interfacing unit can include an input 604 and an output unit 606 that provide, respectively, the input and output interfaces to the apparatus. The memory may include one or more applications that are executable by the CPU. The input and output units may be configured or arranged to send and receive data, and/or messages according to one or more protocols used in the above-mentioned communication standards.

In an exemplary embodiment the input unit may provide circuitry for obtaining data, user input and/or messages to the apparatus. The obtaining may include receiving radio frequency signals by an antenna, for example. In another example, the obtaining may include receiving wired transmissions via an Ethernet adapter. In yet another example, the obtaining may include receiving input from a user via a user input device including one or more of a keyboard, computer mouse and/or a touch screen.

In an exemplary embodiment the output unit may provide circuitry for transmitting data, user output signals and/or messages from the apparatus. The transmitting may include transmitting radio frequency signals by an antenna, for example. In another example, the transmitting may include transmitting wired transmissions via an Ethernet adapter. In yet another example, the transmitting may include displaying a user interface or a view by visual signals.

In an exemplary embodiment the interfacing unit may include a display for displaying information (e.g., a user interface or a view). The display may be a touchscreen that can detect the presence and location of a touch within the display area. The touching may be provided by human touch or by a device mediating the human touch (e.g., a stylus). Accordingly, a touchscreen may provide receiving the commands from a user and displaying configuration information in response to the command from the user.

In an exemplary embodiment, the input unit provides a communications interface for reading a data storage of a manual according to, and the output unit provides a communications interface for installing configuration information read from the data storage to a frequency converter. The input and output units may provide further communications as is described in various embodiments. It is possible to provide a separate an input and an output unit for each communications standard and/or technology.

The CPU may include a set of registers, an arithmetic logic unit, and a control unit. The control unit is controlled by a sequence of program instructions transferred to the CPU from the memory. The control unit may contain a number of microinstructions for basic operations. The implementation of micro-instructions may vary, depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions. The memory may be a volatile or a non-volatile memory, for example EEPROM, ROM, PROM, RAM, DRAM, SRAM, firmware, programmable logic, etc.

The apparatus 600 may be implemented as an electronic digital computer, which may include a working memory (RAM), a central processing unit (CPU), and a system clock. The CPU may include a set of registers, an arithmetic logic unit, and a control unit. The control unit is controlled by a sequence of program instructions transferred to the CPU from the RAM. The control unit may contain a number of microinstructions for basic operations.

The implementation of microinstructions may vary, depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions.

An exemplary embodiment provides a computer program embodied on a distribution medium, having program instructions which, when loaded into an electronic apparatus, cause the execution of a method as disclosed herein.

The computer program may be in source code form, object code form, or in some intermediate form, and it may be stored in some sort of non-transitory carrier, which may be any entity or device capable of carrying the program. Such carriers include a record medium, computer memory, read-only memory, electrical carrier signal, telecommunications signal, and software distribution package, for example. Depending on the processing power desired, the computer program may be executed in a single electronic digital computer or it may be distributed amongst a number of computers.

The apparatus according to an exemplary embodiment may be implemented as one or more integrated circuits, such as application-specific integrated circuits ASIC. Other hardware embodiments are also feasible, such as a circuit built of separate logic components. A hybrid of these different implementations is also feasible. When selecting the method of implementation, a person skilled in the art will consider the specifications set for the size and power consumption of the apparatus 600, desired processing capacity, production costs, and production volumes, for example.

The apparatus according to an exemplary embodiment may also be a user terminal which is a piece of equipment or a device that associates, or is arranged to associate, the user terminal and its user with a subscription and allows a user to interact with a communications system. The user terminal presents information to the user and allows the user to input information. In other words, the user terminal may be any terminal capable of receiving information from and/or transmitting information to the network, connectable to the network wirelessly or via a fixed connection. Examples of the user terminal include a personal computer, a game console, a laptop (a notebook), a personal digital assistant, a tablet computer, a mobile station (mobile phone), and a line telephone.

Apparatuses, such as MCDs and/or other corresponding devices or apparatuses implementing the functionality of a corresponding apparatus described with an exemplary embodiment can include not only known means, but also means for obtaining configuration information of a frequency converter from a data storage in a manual, the manual including a data storage storing operational configuration information of the frequency converter, wherein the configuration information is encoded to the data storage to be wirelessly readable from the data storage, and means for installing the obtained configuration information to the frequency converter by transmitting the obtained configuration information over a wireless connection.

More precisely, the apparatuses described with exemplary embodiments may include means for implementing functionality of a corresponding apparatus described herein and they may include separate means or units for each separate function, or means may be configured to perform two or more functions. Present apparatuses can include processors and memory that can be utilized in an exemplary embodiment. Programs, also called program products, including software routines, applets and macros, can be stored in any apparatus-readable data storage medium and they include program instructions to perform particular tasks. All modifications and configurations required for implementing functionality of an embodiment may be performed as routines, which may be implemented as added or updated software routines, application circuits (ASIC) and/or programmable circuits. Further, software routines may be downloaded into an apparatus. The apparatus, such as a drive system or a frequency converter or an optical code reader, or a corresponding component, may be configured as a computer or a microprocessor, such as single-chip computer element, including at least a memory for providing storage area used for arithmetic operation and an operation processor for executing the arithmetic operation. An example of the operation processor includes a central processing unit. The memory may be removable memory detachably connected to the apparatus.

Exemplary embodiments, disclosed herein can be applicable to any a drive system or a frequency converter or a MCD that is communicating wirelessly configuration information of a frequency converter. The steps/points, signaling messages and related functions described above in FIGS. 3 and 4 are in no absolute chronological order, and some of the steps/points may be performed simultaneously or in an order differing from the given one. Other functions can also be executed between the steps/points or within the steps/points and other signaling messages sent between the illustrated messages. Some of the steps/points or part of the steps/points can also be left out or replaced by a corresponding step/point or part of the step/point. The operations of an apparatus according to exemplary embodiments may be implemented in one or more physical or logical entities. The signaling messages are only exemplary and may even comprise several separate messages for transmitting the same information. In addition, the messages may also contain other information.

It will be apparent to those skilled in the art that, as the technology advances, the inventive concepts disclosed herein can be implemented in various ways. The invention and its embodiments are not limited to the examples described above but may vary within the scope of the claims.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. A method for execution by a wireless communications device, comprising:
   obtaining configuration information of a frequency converter from a data storage in a manual for a frequency converter, the manual having a data storage storing operational configuration information of the frequency converter; wherein the configuration information is encoded to the data storage to be wirelessly readable from the data storage;
   installing the obtained configuration information to the frequency converter by transmitting the obtained configuration information over a wireless connection;
   obtaining operational information of the frequency converter, when the frequency converter is operated according to the installed configuration information;
   displaying the operational information to a user;
   receiving a user input in response to the displayed operational information; and
   determining an operational status of the frequency converter based on the received input.

2. A method according to claim 1, wherein the data storage comprises:
   a transponder for transmitting the operational configuration information in response to reception of a radio frequency signal that gives energy for the transmission.

3. A method according to claim 2, wherein the configuration information comprises:
parameters of the frequency converter and/or operational instructions, said parameters including at least one from an output voltage, output electrical current, output frequency and application specific information.

4. A method according to claim 1, wherein the data storage comprises:
an optical code, whereby the configuration information is encoded to the optical code for display on the manual.

5. A method according to claim 4, wherein the data storage comprises:
at least one of a bar code, a matrix barcode, a 2D-bar code and a Quick Response code.

6. A method according to claim 4, wherein the configuration information comprises:
parameters of the frequency converter and/or operational instructions, said parameters including at least one from an output voltage, output electrical current, output frequency and application specific information.

7. A method according to claim 1, wherein the configuration information comprises:
parameters of the frequency converter and/or operational instructions, said parameters including at least one from an output voltage, output electrical current, output frequency and application specific information.

8. A method according to claim 1, wherein the manual is encoded in a format comprising:
a book, a leaflet, a computer readable document or a sticker.

9. A method according to claim 1, wherein the wireless connection comprises:
one of a Bluetooth connection, a wireless local area network WLAN connection, an infrared connection or a near field communications NFC connection.

10. A method according to claim 1, wherein the operational status of the frequency converter comprises: 'operational', 'maintenance' and 'faulty'.

11. A method according to claim 1, wherein when an operational status of the frequency converter is 'faulty', operational information of the frequency converter indicates one or more faults raised by operating the frequency converter, whereby the method comprises:
querying over a communications network a knowledgebase of a service center for solutions to the faults.

12. A method according to claim 1, wherein when an operational status of the frequency converter is 'maintenance', the method comprises:
adjusting configuration information of the frequency converter; and
installing the adjusted configuration information to the frequency converter over the wireless connection.

13. An apparatus comprising:
a first communications interface for reading a data storage of a manual for a frequency converter, the manual having a data storage storing operational configuration information of the frequency converter; wherein the configuration information is encoded to the data storage to be wirelessly readable from the data storage;
a second communications interface for communicating with a frequency converter over a wireless connection; and
means configured for performing, when in operation, obtaining configuration information of a frequency converter from the data storage in the manual;
installing the obtained configuration information to the frequency converter by transmitting the obtained configuration information over a wireless connection;
obtaining operational information of the frequency converter, when the frequency converter is operated according to the installed configuration information;
displaying the operational information to a user;
receiving a user input in response to the displayed operational information; and
determining an operational status of the frequency converter based on the received input.

14. An apparatus according to claim 13, wherein the apparatus is a communications device, a computer, a mobile phone, a tablet computer or a smart phone.

15. An apparatus according to claim 13, wherein the data storage comprises:
a transponder for transmitting the operational configuration information in response to reception of a radio frequency signal that gives energy for the transmission.

16. An apparatus according to claim 13, wherein the data storage comprises:
an optical code, whereby the configuration information is encoded to the optical code for display on the manual.

17. An apparatus according to claim 16, wherein the data storage comprises:
at least one of a bar code, a matrix barcode, a 2D-bar code and a Quick Response code.

18. An apparatus according to claim 13, wherein the configuration information comprises:
parameters of the frequency converter and/or operational instructions, said parameters including at least one from an output voltage, output electrical current, output frequency and application specific information.

19. An apparatus according to claim 13, wherein the manual is encoded in a format comprising:
a book, a leaflet, a computer readable document or a sticker.

20. A computer program embodied on a non-transitory distribution medium, having program instructions which, when loaded into an apparatus will cause execution of functions comprising:
obtaining configuration information of a frequency converter from a data storage in a manual for a frequency converter, the manual having a data storage storing operational configuration information of the frequency converter; wherein the configuration information is encoded to the data storage to be wirelessly readable from the data storage;
installing the obtained configuration information to the frequency converter by transmitting the obtained configuration information over a wireless connection;
obtaining operational information of the frequency converter, when the frequency converter is operated according to the installed configuration information;
displaying the operational information to a user;
receiving a user input in response to the displayed operational information; and
determining an operational status of the frequency converter based on the received input.

* * * * *